Feb. 11, 1964    C. B. KILGORE ETAL    3,121,002
PROCESS OF AND APPARATUS FOR RECOVERING
CONDENSABLES FROM A GAS STREAM
Filed Oct. 31, 1960
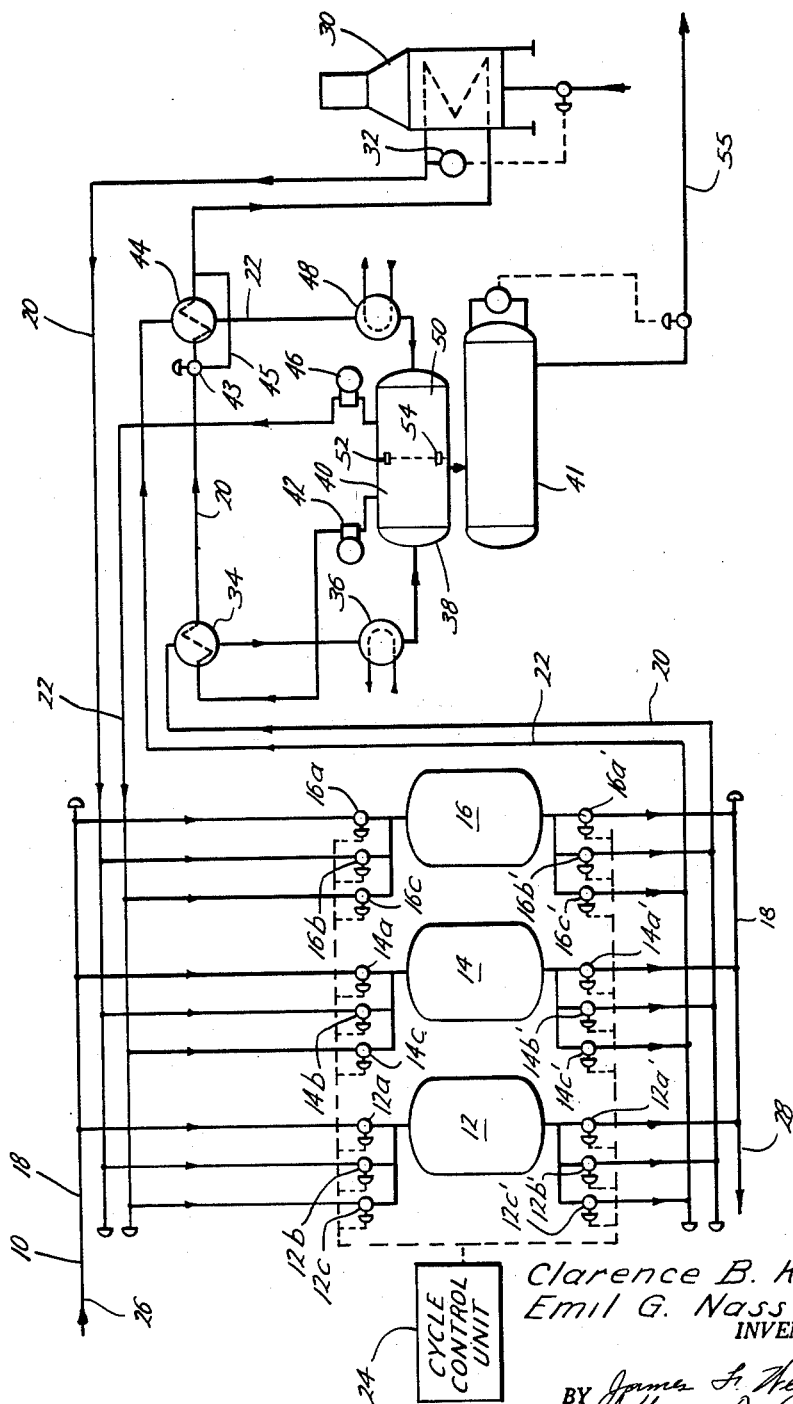
Clarence B. Kilgore
Emil G. Nasser
INVENTORS
BY
ATTORNEYS United States Patent Office 3,121,002
Patented Feb. 11, 1964

3,121,002
PROCESS OF AND APPARATUS FOR RECOVERING CONDENSABLES FROM A GAS STREAM
Clarence B. Kilgore and Emil G. Nasser, Houston, Tex., assignors, by mesne assignments, to Tenex Corporation, Houston, Tex., a corporation of Texas
Filed Oct. 31, 1960, Ser. No. 66,098
8 Claims. (Cl. 55—33)

The present invention relates to a process of and an apparatus for recovering condensables from a gas stream, and more particularly relates to such a process and apparatus which recovers water and hydrocarbons from a hydrocarbon gas stream.

Generally it is old to recover condensables such as water and hydrocarbons from a hydrocarbon gas stream by alternately passing the gas stream through a plurality of beds of adsorbent material which adsorb the condensables from the gas stream. Thus, when one of the beds has become saturated with the condensables a hot gas is flowed through the bed heating it, vaporizing the condensables adsorbed therein, and driving the condensables out of the hot bed, and the hot gas is then passed through a condenser to an accumulator and the condensed liquids are drawn off. After the condensables have been driven out of the heated bed a cooling gas is passed through the heated bed cooling the bed thereby preparing it again for adsorbing more condensables from the gas stream. Thus, each of the beds alternately goes through an adsorption and a regeneration cycle, the regeneration cycle consisting of a heating and a cooling phase or cycle. However, the processes and equipment now in use do not achieve maximum regeneration and either pass gas out of the system which has not been thoroughly desorbed or else pass gas back through the system again to thoroughly desorb the gas thus resulting in an inefficient operation. The present invention is directed to improvements in the regeneration process and apparatus which would provide efficient conditions of operations and increase the recovery of condensables from the gas stream and is particularly directed to providing a closed regeneration cycle.

It is an object of this invention to provide a process of and an apparatus for recovering condensables from a gas stream by continuously circulating the same heating gas through the heating circuit and through a saturated adsorbent bed to obtain optimum condensing conditions.

It is a further object of the present invention to provide a process of and an apparatus for recovering condensables from a gas stream by continuously circulating a captive gas stream through a heated adsorbent bed and a cooling circuit for efficiently and effectively cooling the heated bed.

A still further object of the present invention is the provision of a process of and an apparatus for providing fluid communication between a captive heating gas and a captive cooling gas thereby insuring a proper balance of gas pressures and volumes within a closed regeneration circuit.

Yet a still further object of the present invention is the provision of a process of and an apparatus for recovering condensables from a hydrocarbon gas stream by passing the stream through at least three adsorbent beds which are simultaneously and continuously but alternately going through an adsorption, a heating regeneration cycle and a cooling regeneration cycle and circulating a captive supply of heated gas through the bed which has completed the adsorption cycle and through a heating regeneration circuit including a condenser and a separator thereby heating the adsorbed bed and driving the condensables out of the adsorbed bed and condensing and separating the condensables from the captive supply of heating gas.

Yet a further object of the present invention is the provision of a process of and an apparatus for separating water and hydrocarbons from a gas stream which is alternately passed through at least three beds of adsorbent material which are simultaneously and continuously but alternately going through an adsorption cycle, a heating regeneration cycle, and a cooling regeneration cycle in which a captive cooling gas is passed through a heated adsorbent bed and through a cooling circuit which includes a condenser and a separator whereby the heated bed is cooled and the condensables are condensed and separated from the cooling gas.

A still further object of the present invention is the provision of a process of and an apparatus for recovering hydrocarbons from a hydrocarbon gas stream which is alternately passed through at least three adsorbent beds which are simultaneously and continuously but alternately going through adsorption and a closed regeneration cycle which includes a heating and cooling circuit and providing for the flow of gas from the heating circuit to the cooling circuit to maintain a balance within the closed regeneration cycle.

A still further object of the present invention is to provide a process of and an apparatus for extracting hydrocarbons from a gas stream by providing a closed regeneration cycle which includes a heating and cooling circuit and providing for the expansion of gas from the heating circuit to the cooling circuit which balances the pressures in the regeneration cycle and yet allows the use of separate captive gas streams of heating and cooling gas for providing optimum regeneration conditions.

A still further object of the present invention is the provision of a process of and apparatus for recovering condensables from a gas stream by providing a continuous process in which the adsorption, heating, and cooling circuits are continuously operating thereby providing effective and maximum efficiency.

Other and further objects, features and advantages will be apparent from the following description of a presently preferred embodiment of the invention, given for the purpose of disclosure, and taken in conjunction with the accompanying drawing, and The drawing is a schematic flow diagram illustrating the process and apparatus according to the present invention.

The present invention will presently be described in its operation of removing water and/or recovering propane and heavier hydrocarbons from a stream of natural gas; however, this is by way of example only and it may be used to separate one or more components from a gaseous mixture.

The adsorption system 10 of the present invention generally includes a plurality of beds 12, 14 and 16, an adsorption circuit 18 for passing the gas stream alternately through one of the beds whereby the condensables such as water and hydrocarbons are adsorbed from the stream, a heating circuit 20 whereby a heated gas is passed through an adsorbent bed which has become saturated and drives off and vaporizes the condensables and includes apparatus to recover the condensables from the supply of heated gas, and a cooling circuit 22 for cooling the heated bed and preparing it for another adsorption cycle. The process thus includes an adsorption and a regeneration cycle and the regeneration cycle includes a heating and a cooling cycle. Thus the adsorption, heating and cooling processes are each operating continuously and simultaneously with each other, each cycle being shifted to a succeeding adsorbent bed at the end of each cycle.

The beds 12, 14 and 16 may contain a suitable adsorbent material for adsorbing condensables from the gas stream such as silica gel and/or activated carbon. Each of the adsorbent beds 12, 14 and 16 has an inlet and outlet line and valves arranged to alternately connect each of the beds to the adsorption circuit 18, the heating circuit 20, and the cooling circuit 22. For convenience of reference the valves are given the same prefix number as their corresponding adsorbent bed and the inlet valves are given a suffix of "a," "b," "c," corresponding to the valves in the adsorption circuit 18, the heating circuit 20, and the cooling circuit 22, respectively. The outlet valves are similarly numbered with the addition of the suffix being primed. A suitable cycle control unit 24 is provided for controlling the operation and sequence of all of the inlet and outlet valves to the adsorbent beds 12, 14 and 16, and any convenient means is satisfactory and no further description is believed necessary. However, the cycle control unit 24 operates the inlet and outlet valves to establish the sequence of operation. This sequence is arranged so that each bed is placed first in adsorption, secondly in regeneration heating, and thirdly in regeneration cooling and then repeats the process.

Thus assuming that adsorbent bed 12 is on the adsorption cycle, bed 14 is on the heating regeneration cycle, and bed 16 is on the cooling regeneration cycle, valves 12a and 12a' would be the only valves open which are connected to the adsorption circuit 18. Thus the gas stream would enter the adsorption circuit 18 through conductor 26 and pass through the adsorbent bed 12 whereby the condensables are adsorbed and the lean gas would pass out of the system through the main gas stream outlet 28. As will more fully be described hereinafter, when bed 12 is saturated with condensables the cycle control unit 24 will actuate the proper valve thereby connecting the saturated bed 12 to the heating circuit 20 where heated gas will pass through the bed 12 and vaporize the adsorbed condensables and subsequently the bed 12 will be connected into the cooling circuit so that it may be cooled and be prepared for another adsorption cycle. Simultaneously the other beds 14 and 16 go through the exact same sequence but at alternate times with the bed 12 and each other.

The heating circuit 20 includes a heater 30 which may be heated by any conventional means and has a suitable temperature control 32. After the gas is heated it is passed through the bed which has become saturated thereby vaporizing the adsorbent and driving it from the saturated bed. The heated regeneration gas passes from the saturated bed and passes through a heat exchanger 34 giving up heat to the portion of the heating circuit 20 in which gas is being directed toward the heater 30. The rich gas then continues from the heat exchanger 34 to a suitable condenser 36 and then to a gas scrubber 38 having two compartments. Compartment 40 is the heating gas scrubbing compartment or heating gas scrubber where the condensed condensables are separated from the vapors. The condensed liquids are then passed to a liquid product accumulator 41 and the separated gas returns to the regeneration heating gas compressor 42 through the heat exchanger 34 where it receives heat, through the heat exchanger 44 where it receives heat from the cooling circuit gas which has just passed through the hot bed, and the separated gas returns to the regeneration heater 30 to repeat the cycle. Thus it is noted that the heating circuit 20 uses the same vapor over again to obtain optimum condensing conditions. The heating cycle is continued until the adsorbent bed has reached a sufficiently high temperature to effectively drive off the adsorbed condensables and then the heating circuit 20 is connected by the valves to another bed which has just been saturated, but still uses substantially the same captive regeneration gas.

In the cooling circuit 22 another captive gas stream is forced by the regeneration cooling gas compressor 46 through the hot adsorbent bed through which hot regeneration gas has been passed, cooling the heated bed as well as driving off the vaporized adsorbate left in the bed from the previous heating regeneration cycle, then successively through a heat exchanger 44 where the heat from the cooling circuit 22 is given up to the heating circuit 20 to the gas returning to the heater 30, then to a condenser 48 where vaporized adsorbate is condensed, and then to a regeneration cooling gas scrubber compartment 50. The recovered liquid drains to the accumulator compartment 50 and the separated gas returns to the regeneration cooling gas compressor 46 to continue the cycle. The condensed liquid in the compartment 50 passes through port 54 in the scrubber 38 to the compartment 40 and then is collected in the liquid accumulator 41. Thus it is noted that the cooling cycle also uses a captive vapor over again to obtain optimum conditions for this cycle. It is noted that the cooling circuit 22 as well as the heating circuit 20 includes a condenser and separator. This is desirable as the heating circuit utilizes a captive or closed heating stream to obtain optimum condensing conditions, the vapors in the heating cycle are rich and thus the adsorbent bed is not completely desorbed in the heating cycle and then can be further desorbed in the cooling cycle.

It is also noted that in using separate closed cycles for heating and for cooling, the regeneration cycle is closed and is not in communication with other parts of the system. In the heating phase of the regeneration cycle the regeneration heating gas expands because of increase in the temperature of the gas used in vaporizing liquid from the bed. However, in the cooling phase of the regeneration cycle, the regeneration cooling gas contracts because of decrease in the temperature of the gas used for cooling the bed. The expansion in the heating phase of the regeneration cycle approximately equals the contraction in the cooling phase of the regeneration cycle. Therefore, fluid communicating means may be provided between the heating circuit 20 and the cooling circuit 22 thus allowing the gas expanding during the heating phase in the heating circuit to pass into the cooling circuit 22 to avoid undue pressures in these circuits. Preferably, a port 52 may be provided between the compartments 40 and 50 in the gas scrubber 38 thereby providing a proper balance of gas flows in both phases of the regeneration cycle within the confines of the regeneration circuits. Of course, if desired, separate gas scrubbers could be provided in place of the compartmentalized scrubber 38 and the gas communication between the separate scrubbers could be through the liquid product accumulator 41 or other gas communicating means could be provided between the heating and cooling circuits. And while the heating circuit 20 and cooling circuit 22 could be connected at other places to maintain the balance of gas pressure in the regeneration cycle, it is preferable to effect this transfer of gas flow from the heating cycle 20 to the cooling cycle 22 downstream of the condensers 36 and 48 and after the liquid has been separated from the vapor whereby little heat and condensable transfer is effected between the circuits to interfere with their effectiveness as separate cycles. Thus, the regeneration cycle is closed, providing an efficient regeneration cycle and is self-equalizing as regards gas pressure and gas volume and yet the heating and cooling phases of the regeneration cycle are effectively separate and effectively closed insofar as heat and condensables transfer is concerned thereby providing optimum regeneration conditions in each separate phase. It is also noted that since the transfer of gas takes place between the heating circuit 20 and the cooling circuit 22 after the gas streams in each circuit have been condensed and separated from the liquid that there is no transfer of gases from one circuit to another which would have to be reprocessed.

It is noted that heat exchangers 34 and 44 provide for effective and efficient heat transfer between the regeneration heating and regeneration cooling circuits and thereby improving the thermal efficiency of the process. However, the temperature exchange in the heat exchanger 44 in the latter portion of the regeneration cycle becomes ineffective because the temperature in the cooling circuit 22 has decreased and the temperature of the heating circuit 20 has increased which would change the direction of the heat exchange. Therefore, a control valve 43 and bypass circuit 45 is provided to divert the heating regeneration gas stream around the heat exchanger 44 during this latter portion of the cycle to prevent a reverse heat exchange in the heat exchanger 44. Suitable control means are provided to control valve 43.

In operation, assume that adsorption bed 12 is on the adsorption cycle, and that beds 14 and 16 are on the regeneration cycle with bed 14 being in the heating regeneration cycle and the bed 16 being in the cooling regeneration cycle. Thus, as to bed 12, gas flows from the hydrocarbon gas stream 26 in the adsorption circuit 18 through valves 12a and 12a' through the bed 12 and out the gas stream outlet conductor 28. At the same time in the heating circuit 20 the heater 30 is heating a captive gas stream which is forced through the circuit 20 by the heating gas compressor 42 and through the valves 14b and 14b' through the saturated adsorbent bed 14 where the bed 14 is heated and the heated gas drives off the adsorbed condensables. The heated condensables are passed through the heat exchanger 34 giving up heat, and passing through the condenser 36 where the rich gas is cooled and condensed and then into the separating compartment 40 of the gas scrubber 38 where the liquids are drawn off and transferred to the liquid product accumulator 41 and out line 55 and the vapors returned to the compressor 42. The separated vapors after passing through the compressor 42 are heated in the heat exchanger 34 and the heat exchanger 44 and passed to the heater 30 to be heated and then continue the cycle.

At the same time adsorbent bed 16 is being cooled by the cooling circuit 22 wherein another captive gas stream is forced by the regeneration cooling compressor 46 through the hot adsorbent bed 16 which has been previously heated thereby cooling the bed as well as driving off the vaporized adsorbate left in the bed 16 from the previous heating cycle. The cooling gas supply passes through bed 16 through the valves 16c and 16c' which are now open and then to the condenser 44 where they give up heat to the heating circuit gas and are then condensed in condenser 48 and passed to the separator compartment 50 and the scrubber 38 whereby the recovered liquid drains to the liquid product accumulator 41 through the liquid port 54 and out line 55 and the separated gas returns to the regeneration cooling gas compressor 46 to continue the cooling cycle.

And in order to provide a balance between the heating circuit 20 and the cooling circuit 22 the separated vapors in the scrubber 38 may be passed from the compartment 40 to the compartment 50 through the port 52 thereby balancing the gas pressures and volumes between the heating and cooling circuits. And the fluid communication between the circuits at this point insures that there is a minimum of heat transfer and transfer of condensables between the circuits.

After each cycle has been concluded, the cycle control unit 24 actuates the various control valves to transfer the bed 12 from the adsorption circuit 18 to the heating circuit 20, bed 14 is transferred from the heating circuit 20 to the cooling circuit 22, and bed 16 is transferred from the cooling circuit 22 to the adsorption circuit 18. Thus each bed continually adsorbs, is heated, and is cooled and again returned to adsorb.

Thus a process and apparatus is provided for recovering condensables from a gas stream by passing the gas stream alternately through a plurality of adsorbent beds to adsorb the condensables and simultaneously and continuously but alternately passing the beds through the adsorption and regeneration cycles and providing a closed regeneration cycle wherein the heating and cooling phases are separate and utilize a captive gas to provide the optimum operating conditions for each phase.

The present invention, therefore, is well adapted to carry out the objects and attain the ends and advantages mentioned as well as others inherent therein. While a presently preferred embodiment of the invention is given for the purpose of disclosure, numerous changes in the details of construction, arrangement of parts and steps of the process may be made which will readily suggest themselves to those skilled in the art and which are encompassed within the spirit of the invention and the scope of the appended claims.

What is claimed is:

1. The improvement in the process of recovering condensables from a gas stream which is alternately passed through at least three separate beds containing fixed adsorbent material to remove the condensables from the gas stream and which beds are simultaneously and continuously but alternately going through adsorption, heating and cooling circuits comprising, circulating a closed supply of heating gas successively and continuously through the heating circuit which is separate and distinct from the adsorption circuit and the cooling circuit, said heating circuit including a heater, a saturated bed, a condenser, and a separator thereby driving out the condensables from the saturated bed and condensing and separating the condensables from the closed supply of heating gas; and simultaneously and continuously circulating a closed supply of cooling gas successively and continuously through the cooling circuit which is separate and distinct from the adsorption circuit and the heating circuit, said cooling circuit including a bed which has been heated, a condenser and a separator whereby the heated bed is cooled and the condensables are condensed and separated from the supply of cooling gas.

2. The invention of claim 1 including the step of flowing a limited amount of gas from the heating gas circuit into the cooling gas circuit to maintain equality of gas pressures between the supply of heating gas and the supply of cooling gas.

3. The invention of claim 1 including the step of flowing only a sufficient amount of heating gas into the supply of cooling gas to maintain equality of gas pressures between the supply of heating gas and the supply of cooling gas, the flow from the heating gas circuit being from a point in the heating circuit upstream of the heater but downstream of the heating gas condenser to a point in the cooling gas circuit downstream of the cooling gas condenser.

4. An adsorption apparatus for the recovery of condensables from a gas stream which includes at least three separate beds containing fixed adsorbent material for removing the condensables by passing the stream alternately through the beds where the beds are simultaneously and continuously but alternatively going through an adsorption, heating and cooling circuit comprising, a closed heating circuit which is separate and distinct from the adsorption circuit and the cooling circuit and which includes, a heating means, a bed which has adsorbed condensables from the gas stream, condensing means, separating means, and pumping means for continuously circulating the heating gas through the heating circuit whereby condensables are condensed and separated from the heating gas; and a closed cooling circuit separate and distinct from the adsorption circuit and the heating circuit which includes, cooling means, a bed that has been heated in the heating circuit, condensing means, separating means, and pump means for continuously circulating the cooling gas through the cooling circuit whereby the heated bed is cooled and the condensables separated from the cooling gas.

5. The invention of claim 4 including fluid communication means between the heating circuit and the cooling circuit whereby a limited amount of heating gas may flow from the heating circuit to the cooling circuit for maintaining a balance of gas pressure between the two circuits.

6. The invention of claim 5 wherein the fluid communication means is connected to a point in the heating circuit upstream of the heater but downstream of the heating gas condenser and to a point in the cooling gas circuit downstream of the cooling gas condenser.

7. The invention of claim 4 including, a first heat exchanger between the heating and cooling circuits, said first exchanger positioned in the heating circuit upstream of the heater and positioned in the cooling circuit upstream of the cooling circuit condenser, a second heat exchanger connected between portions of the heating circuit which are upstream and downstream of the heating circuit condensing means.

8. The invention of claim 7 including, bypass means around the first heat exchanger for preventing reverse heat flow between the heating and cooling circuits during the latter portion of the cooling and heating process.

References Cited in the file of this patent

UNITED STATES PATENTS

| | | |
|---|---|---|
| 2,799,362 | Miller | July 16, 1957 |
| 2,880,818 | Dow | Apr. 7, 1959 |
| 2,919,764 | Dillman et al. | Jan. 5, 1960 |
| 2,993,563 | Munters et al. | July 25, 1961 |
| 3,093,465 | Latta | June 11, 1963 |